Nov. 11, 1952 W. E. LE CLAIR ET AL 2,617,750
DECORATIVE AND PROTECTIVE SHEET
Filed Jan. 10, 1950
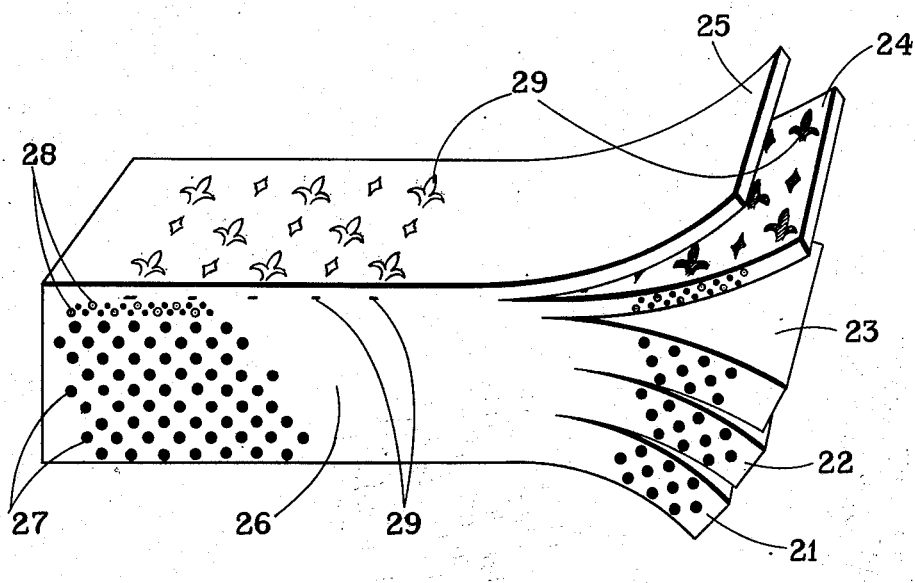
INVENTORS
Willis E. Le Clair
Ernest De Lia
BY Eric E. Franke
ATTORNEY Patented Nov. 11, 1952

2,617,750

UNITED STATES PATENT OFFICE 2,617,750

DECORATIVE AND PROTECTIVE SHEET

Willis E. Le Clair, Peekskill, and Ernest De Lia, Brooklyn, N. Y., assignors to Interchemical Corporation, New York, N. Y., a corporation of Ohio Application January 10, 1950, Serial No. 137,722

4 Claims. (Cl. 154—47)

The present invention relates to compositions suitable as decorative and protective coverings for floors and other surfaces, and to methods of producing such compositions.

More particularly, the invention relates to compositions having wear and resistance qualities which make them outstanding amongst other products of this general type, and to methods permitting the application of color designs by means of gravure printing which, until now, could not be employed with compositions of this type.

It has been recognized before that transparent sheeting of high molecular polyvinyl chloride should provide excellent wear coats or surface layers for floor coverings and the like because of its toughness, elasticity, imperviousness and resistance to acids and alkalies. The present invention constitutes an improvement over prior attempts to take advantage of these properties of polyvinyl chloride. Such prior attempts have included: (1) bonding vinyl sheets to an oleo-resinous treated felt or burlap backing by means of an adhesive; (2) cementing polyvinyl sheets with intermediary paint coats to fibrous sheets or to a linoleum base; and (3) applying a solution of a solvent soluble vinyl chloride-vinylacetate maleic acid copolymer to a fibrous base, volatilizing the solvent to leave, interlocked with the fibers, the copolymer in a discontinuous form and calendering, with heat and pressure, a continuous coating of polyvinyl resin onto the base. Nor has it been found practical to employ any of the so-called transfer methods in the making of protective floor coverings, such as by forming a vinyl film from a solvent solution on a temporary backing sheet and transferring the film from there to a base, for example after printing a design layer and a pigmented background layer on the film.

Notwithstanding the inherent excellent qualities of high molecular polyvinyl chloride, the addition of secondary constituents, such as various plasticizers, is necessary to attain the degree of resiliency and tensile strength which is expected of a wear coat. Still other secondary constituents are required to render the top sheet or wear coat sufficiently heat and light stable. Even after addition of such secondary constituents films produced by volatilizing the solvent of a solution of polyvinyl chloride are too thin and ordinarily not useful, because they are not sufficiently wear resistant and do not afford the proper protection for an underlaying design. We find as one of the requirements of the present disclosure that the polyvinyl wear coat be at least 0.005 inch thick in order to provide adequate factors of residual indentation, impact resistance, flexibility, abrasion resistance, tensile strength and elongation, either by itself or jointly with the base stock.

The amount of usage and wear that can be expected from a floor covering having a polyvinyl chloride top coating depends only partly upon the specific properties of the top coating but is contingent to a great extent upon the properties of the layer or layers making up the base to which the top coat is joined. Applying a polyvinyl chloride sheet as a top coat to, say, a fibrous base or to a fibrous base having a resin or resinous composition discontinuously interlocked with the fibers results in a product of inferior wearing quality. Such a fibrous base, for instance, is characterized by yielding to pressure, impact, and flexing in a manner not affording optimum support to the polyvinyl chloride top coat which provides desired surface and wear characteristics. In addition, it will necessarily transmit its own localized deformation to the attached wear coat and thereby expose the latter to stresses and strains far in excess of those to which the wear coat would be exposed in the absence of any base stock whatsoever. Therefore, it is another requirement for a useful floor covering of the type under consideration that the top coat be attached to a layer or layers of a base material which, if exposed to pressure, impact, or flexing, (a) yields only after an initial resistance commensurate to forces ordinarily encountered by protective floor coverings, and, upon yielding, still affords optimum protection to the top layer of the laminate, (b) yields in such a manner as to disperse destructive loads from the center of exertion of the force, (c) is characterized by factors of impact resistance, flexibility, tensile strength and elongation, as well as factors of dimensional stability and residual indentation which are properly correlated with those of the wear coat.

Obviously, materials such as fibrous sheets, linoleum, or asphalt impregnated felt and the like will not meet the foregoing requirements. On the other hand, sheets from, say, highly pigmented rubber compositions or from fabrics heavily coated with filled rubbery materials would be entirely adequate because they have the required characteristics, were it not for the fact that polyvinyl chloride sheets contract on aging due to molecular orientation and that a laminate of a polyvinyl chloride wear coat onto one of these rubber bases eventually will either distort in curving up or even break at the lamination. Impediments of this nature become more pronounced where bonding is accomplished at higher temperatures. In this instance, due to a different rate of contraction upon cooling, distortion may occur in newly made products.

We have discovered that these difficulties can be avoided and that the foregoing requirements are met most suitably and economically by joining the wear coat to a base comprising a polyvinyl resin binder having up to 65 per cent mineral fillers. Prior difficulties in attempting to join a polyvinyl chloride top sheet or film to bases of dissimilar character by means of adhesives or by means of a layer of cementing material are completely eliminated. Wear coats from vinyl resins and base stock, such as the above described, containing, aside from the filler, a binder consisting substantially of the identical material as the wear coat, lend themselves to the making of integral laminates by means of heat and pressure without the use of adhesives. In fact, the result of the lamination process is a continuous vinyl system. The filler provides a more satisfactory base stock with respect to pressure, impact, and indentation resistance without any serious impairment of the ability to disperse the influence of such forces over a large area which avoids undue stresses of the wear coat.

One way of decorating the described floor covering composition is to reverse print the clear wear coat before it is laminated to the base stock. In order to mask out the color of the base material it is necessary to give the wear coat one or two blotch coats of the desired background color, which must be particularly heavy in the case of light colors so as to completely obliterate any dark color of the underlaying base stock. Aside from making the printing very expensive, this procedure prohibits employing a wear coat of the desired thickness and toughness because it could not be moved efficiently over a printing roller. Moreover, the wear coat requires, in this instance, a high amount of plasticizer to provide it with the characteristics desirable for maximum printing efficiency. In addition, the procedure results in much solvent being retained by the ink and entrapped between the wear coat and the base stock when laminating the two. The solvent tends to soften the polyvinyl chloride and this, in addition to entrapped solvent vapors often causes wrinkles, blisters, and other defects of the wear coat, such as a seriously reduced abrasion resistance. On the other hand, any attempt of avoiding the softening action by lowering the amount of solvent in the ink which, like methyl ethyl ketone, is a solvent for vinyl resin, and replacing it partly by a non-solvent for vinyl resin, such as toluene, results in an unsatisfactory adhesion of the ink.

We overcome these difficulties by placing an intermediate vinyl layer between the wear coat and the base stock. The intermediate layer is plasticized to provide maximum printing efficiency. It is of about the same order of thickness as the wear coat or less, and is pigmented to the shade of the background color of the contemplated design. There are no difficulties in the printing operation and much less ink is used than in printing the design onto the wear coat and covering it with one or several layers of blotch coat before the wear coat and the base are laminated together. In case of a two color design, for example, with the pigmented intermediate sheet there is only one pass required through the printing machine. The surface of the pigment-loaded, plasticized intermediary sheet is much better suited for printing than the surface of the wear coat. Having eliminated excessive solvent in this manner and having reduced the printed area from 100 per cent to, say, 30 per cent and less, there is no wrinkling or blistering, the wear coat is no longer softened and we find its resistance to abrasion two or three times higher than when using the blotch procedure.

Upon laminating a wear coat, a printed intermediary layer, and several plies of base stock of the aforementioned descriptions, a unitary composition is obtained, characterized by a continuous vinyl resin phase throughout the composition, and strata of discontinuous phases comprising a base filler stratum, an intermediary filler and pigment stratum superimposed with a colored design, and a top stratum substantially devoid of any discontinuous phase. In this manner and by means of adding plasticizers and modifiers to specific strata of the continuous vinyl resin phase, we are able to provide for the specific and mutual requirements of the individual layers, such as toughness, scratch-wear, light- and heat-resistance of the surface, maximum printing efficiency of the intermediary layer, and a base stock balanced in its properties, such as resiliency and indentation resistance with the hardness and wear qualities of the face film.

The following is a preferred formula for the base stock:

26 parts vinyl chloride-vinyl acetate copolymer (93–95% vinyl chloride; average mol. weight 24,000),
29 parts soft clay,
30 parts calcium carbonate,
13 parts dioctyl phthalate,
2 parts dibasic lead stearate.

The material is charged into a Banbury mixer, warmed, held on the mill for about 10 minutes, and is then calendered, at approximately 10 ft. per minute, into, say, 0.035 inch plies, with the calender roll temperatures progressively increasing from 290 to 295, 300 and 305° F.

Other base stocks, comprising 22–30 parts of the foregoing vinyl chloride-vinyl acetate copolymer, 30–35 parts of soft clay, 30–35 parts calcium carbonate, 2–5 parts acrylonitrile butadiene copolymer (35% acrylonitrile), 10–12 parts dioctyl phthalate, and 2 parts dibasic lead stearate are generally poorer in indentation characteristics than the base stock of the preferred formula, probably because of the higher filler load.

Still another base stock, consisting of 31 parts of the foregoing vinyl chloride-vinyl acetate copolymer, 25 parts of soft clay, 30 parts calcium carbonate, 8 parts dioctyl phthalate, 4 parts methyl acetyl ricinoleate, and 2 parts dibasic lead acetate shows improved indentation characteristics, but a hardness exceeding a reading of 98 on a Shore durometer A, which is slightly in excess of the optimum for the herein disclosed purpose.

A preferred formula for the wear coat is as follows:

45 parts polyvinyl chloride having an average mol. weight of 165,000,
32 parts vinyl chloride-vinyl acetate copolymer (93–95% vinyl chloride; average mol. weight 24,000),
18 parts dioctyl phthalate,
2 parts dibasic lead stearate,
3 parts sodium capryl phosphate.

The material is preblended, charged into a Banbury mixer, held on the mill for a short time and calendered into, say, 0.01 inch plies at about 10 yd. per minute with roll temperatures of 250, 255, 260 and 265° F. respectively.

Other wear layers, comprising 30-35 parts of the foregoing polyvinyl chloride having an average mol. weight of 165,000, 25-50 parts of the foregoing vinyl chloride-vinyl acetate copolymer having an average molecular weight of 24,000, 15 parts dioctyl phthalate, 8 parts methyl acetyl ricinoleate, 2 parts dibasic lead stearate, and 2-3 parts sodium capryl phosphate scratch more easily, are somewhat too thermoplastic and have a relatively high rate of water absorption.

Another wear layer of improved scratch resistance consists of 42 parts of the foregoing polyvinyl chloride having an average molecular weight of 165,000, 35 parts of the foregoing vinyl chloride-vinyl acetate copolymer having an average molecular weight of 24,000, 10 parts tricresyl phosphate, 5 parts n-butyl benzoyl phthalate, 3 parts methyl acetyl ricinoleate, 2 parts dibasic lead stearate, and 3 parts sodium capryl phosphate.

Formulae for other wear layers comprise from 78.0 to 81.5 parts polyvinyl chloride having a molecular weight of 150,000-165,000, 16.5-20.0 parts methyl acetyl ricinoleate, and 2 parts of sodium capryl phosphate. A wear coat of this type, containing 16.5 parts of the methyl acetyl ricinoleate plasticizer is about as hard and tough a film as may be calendered with commonly used equipment. For practical purposes we prefer a somewhat less stiff material.

A satisfactory formula for the intermediary film is as follows:

30 parts vinyl chloride-vinyl acetate copolymer (93-95% vinyl chloride; average mol. weight 24,000),
20 parts soft clay,
25 parts hydrated calcium silicate,
15 parts dioctyl phthalate,
2 parts dibasic lead stearate,
2 parts sodium capryl phosphate,
2-6 parts pigments.

The material is preblended, mixed in a Banbury mixer, milled and calendered at about 10 yd. per minute into, say, 0.01 inch plies with roll temperatures of 305, 310, 315 and 320° F.

Other, somewhat harder films usable as intermediary layers comprise 25-35 parts of the foregoing vinyl chloride-vinyl acetate copolymer having an average molecular weight of 24,000, 18-25 parts soft clay, 20-27 parts hydrated calcium silicate, 8-10 parts dioctyl phthalate, 2-4 parts methyl acetyl ricinoleate, 2 parts dibasic lead stearate, 2 parts sodium capryl phosphate, and 2-6 parts pigments.

Another intermediary coat consists of 28 parts of the foregoing vinyl chloride-vinyl acetate copolymer having an average molecular weight of 24,000, 12 parts dioctyl phthalate, 14 parts hydrated calcium silicate, 35 parts calcium carbonate, 4 parts basic lead carbonate, 2 parts sodium capryl phosphate, and 2-6 parts pigments.

The amount of pigment in the above formulae is varied from 2 parts of the darker colors produced from pigments such as carbon black, chromium oxide, chromium hydrate up to 6 parts for whites or light colors such as from titanium oxide, Cadmium Yellow, Cadmium Red, or Ultramarine.

For printing the intermediary sheet with a design we prefer the use of a printing ink comprising, depending upon the type of pigment and the desired opaqueness of the print, from 4.5 to 31.5 per cent by weight pigment dispersed in a methyl ethyl ketone solution of vinyl chloride-vinyl acetate copolymer (85-88% vinyl chloride; average molecular weight 10,000) of such strength that the total solid content (pigment plus copolymer) is between 15 and 37.5 per cent.

After the intermediary sheet has been printed with the design, a laminate is made up from the wear sheet, the intermediary sheet and from, preferably, several plies of the base stock, as shown in the attached diagrammatic presentation. The numerals 21, 22, and 23 indicate three plies of the aforedescribed base stock. In our preferred embodiment each of the three plies is 0.035 inch thick. The numeral 24 refers to the intermediary sheet, preferably consisting of an 0.005 to 0.01 inch ply. Overlaying the intermediary sheet is a transparent or translucent wear coat 25, as described, preferably consisting of a 0.01 inch ply. The continuous vinyl resin phase which, after lamination, extends through the entire product, is indicated by the numeral 26. The stratified discontinuous phases are represented by a base filler stratum 27, an intermediary filler-pigment stratum 28 and, sandwiched in between the intermediary filler-pigment stratum 28 and the top stratum 25 which is substantially devoid of any discontinuous phase, a broken colored design stratum 29, consisting of a discontinuous pigment phase which differs in color from the filler-pigment stratum 28.

The lamination is most practically effectuated by means of the method and apparatus described in U. S. Patent 2,434,541. If a matte surface of the wear coat is desired, the laminating surface coming in contact with the wear coat can be wrapped with parchment paper. A rough bottom finish for proper adhesion can be obtained by lining the respective laminating surface with coarsely woven fabric. The lamination is best accomplished at a "curing" time of about 5 minutes in contact with the laminating surfaces exerting a pressure of about 65 p. s. i., whereby the surface next to the wear coat has a temperature of about 290° F. and the surface pressing against the base has a temperature of about 320° F.

While the foregoing description refers more specifically to a laminate which is useful as a floor cover, it is obvious that for different uses, such as a table or will cover, other dimensional requirements will be placed upon the laminate. Thus, gravure printed wall coverings can be made in this manner for shower stalls, bathrooms, or kitchens, which are completely resistant to influences of the atmosphere, water, steam, and alkali. Being less exposed to mechanical wear than a floor covering, a base sheet of 0.01 inch thickness and a top sheet of 0.002 to 0.004 inch is entirely satisfactory. On the other hand, if it is desired to cover the walls with individual tiles instead of a sheet, such tiles are preferably cut from a somewhat thicker composition, say, from a laminate having a base stock comprising one or two 0.035 inch plies. In addition, the invention permits the production of sheets of simulated tiles, wherein each tile is bordered and set off against the other by grooves which are cut, stamped or machined out of the sheet. Using a laminate substantially identical with that of a floor covering, but having a base pigment stratum contrasting in color with the pigment stratum of the intermediary layer, and cutting say, a square tile pattern into the sheet,

We claim:

1. A sheet formed by a heterogeneous system comprising a continuous vinyl resin phase including a plurality of stratified discontinuous phases, wherein a bottom discontinuous phase stratum is made up of a 55 to 65 per cent by weight filler load, an intermediary discontinuous phase stratum is made up of a 30 to 50 per cent by weight filler load and a 2 to 6 per cent by weight pigment load, a broken, discontinuous design stratum which is apportioned over the surface of the intermediary discontinuous phase stratum is made up of a 30 to 85 per cent by weight pigment load differing in color from the fillers and pigment of the said intermediary discontinuous phase stratum, and a top stratum of the said continuous vinyl resin phase which is substantially free of any discontinuous phase.

2. A sheet according claim 1, wherein the fillers forming the bottom discontinuous phase stratum and the fillers and the pigment forming the intermediary discontinuous phase stratum are dispersed in strata of the continuous vinyl resin phase comprising a vinyl chloride-vinyl acetate copolymer consisting of 88 to 95 per cent vinyl chloride and having a molecular weight between 18,000 and 26,000 and the pigment forming the broken, discontinuous design stratum is dispersed in a stratum of the continuous vinyl resin phase comprising a vinyl chloride-vinyl acetate copolymer consisting of 80 to 88 per cent vinyl chloride and having a molecular weight between 8,000 and 12,000.

3. A sheet according claim 1, wherein the top stratum of the continuous vinyl resin phase comprises a polyvinyl chloride having a molecular weight of 120,000 to 180,000.

4. A sheet according claim 3, wherein 35 to 65 per cent of the polyvinyl chloride having a molecular weight of 120,000 to 180,000, comprising the top stratum of the continuous vinyl resin phase, is replaced by a vinyl chloride-vinyl acetate copolymer consisting of 88 to 95 per cent vinyl chloride and having a molecular weight between 18,000 and 26,000.

WILLIS E. LE CLAIR.
ERNEST DE LIA.

REFERENCES CITED

The following references are of record in the file of this patent:

UNITED STATES PATENTS

| Number | Name | Date |
|---|---|---|
| 1,702,161 | Huppuch | Feb. 12, 1929 |
| 1,966,856 | Groff | July 17, 1934 |
| 2,067,012 | Loetscher | Jan. 5, 1937 |
| 2,335,190 | Minich | Nov. 23, 1943 |
| 2,374,940 | Kemmler | May 1, 1945 |
| 2,430,934 | Kemmler | Nov. 18, 1947 |
| 2,434,541 | Bierer | Jan. 13, 1948 |